(12) United States Patent
Gebing et al.

(10) Patent No.: US 12,196,769 B2
(45) Date of Patent: Jan. 14, 2025

(54) METHOD AND DEVICE FOR SCANNING MICROSCOPE SLIDES

(71) Applicants: Thomas Gebing, Vreden (DE); Thomas Deuster, Sachsenheim (DE)

(72) Inventors: Thomas Gebing, Vreden (DE); Thomas Deuster, Sachsenheim (DE)

( * ) Notice: Subject to any disclaimer, the term of this patent is extended or adjusted under 35 U.S.C. 154(b) by 559 days.

(21) Appl. No.: 17/602,312

(22) PCT Filed: Apr. 7, 2020

(86) PCT No.: PCT/DE2020/100283
§ 371 (c)(1),
(2) Date: Oct. 8, 2021

(87) PCT Pub. No.: WO2020/211901
PCT Pub. Date: Oct. 22, 2020

(65) Prior Publication Data
US 2022/0187329 A1    Jun. 16, 2022

(30) Foreign Application Priority Data

Apr. 15, 2019   (DE) .................... 10 2019 109 962.5

(51) Int. Cl.
*G02B 21/34*   (2006.01)
*B25J 11/00*   (2006.01)
(Continued)

(52) U.S. Cl.
CPC ... *G01N 35/00029* (2013.01); *G01N 35/0099* (2013.01); *G02B 21/34* (2013.01);
(Continued)

(58) Field of Classification Search
None
See application file for complete search history.

(56) References Cited

U.S. PATENT DOCUMENTS

| | | | | |
|---|---|---|---|---|
| 4,159,875 A | * | 7/1979 | Hauser | B01L 3/545 356/244 |
| 5,287,272 A | * | 2/1994 | Rutenberg | G06N 3/04 382/156 |

(Continued)

FOREIGN PATENT DOCUMENTS

| | | |
|---|---|---|
| DE | 602004002700 T2 | 8/2007 |
| DE | 102009015596 A1 | 10/2010 |

(Continued)

OTHER PUBLICATIONS

English Abstract for DE102013205001 B3, May 28, 2014.
(Continued)

*Primary Examiner* — Derek S. Chapel
(74) *Attorney, Agent, or Firm* — CAHN & SAMUELS, LLP

(57) ABSTRACT

A method for scanning microscope slides using a device with at least one feed unit for microscope slide holders, at least two microscope slide scanners, at least one depositing device, and at least one industrial robot, includes: a) loading the feed unit with at least one microscope slide holder, which holds at least one microscope slide, b) removing the microscope slide from the at least one microscope slide holder, c) inserting the removed microscope slide into one of the microscope slide scanners, d) removing the microscope slide from one of the microscope slide scanners, and e) depositing the microscope slide in the depositing device, wherein steps b) to e) are carried out by at least one industrial robot.

17 Claims, 1 Drawing Sheet

(51) Int. Cl.
  *G01N 35/00*  (2006.01)
  *G02B 21/32*  (2006.01)
(52) U.S. Cl.
  CPC ..... *B25J 11/00* (2013.01); *G01N 2035/00039* (2013.01); *G01N 2035/00138* (2013.01); *G02B 21/32* (2013.01)

(56) References Cited

U.S. PATENT DOCUMENTS

| | | | |
|---|---|---|---|
| 5,367,401 A * | 11/1994 | Saulietis | G02B 21/26 359/398 |
| 7,303,725 B2 * | 12/2007 | Reinhardt | G01N 1/312 422/65 |
| 7,327,515 B2 | 2/2008 | Virag et al. | |
| 2004/0114227 A1 * | 6/2004 | Henderson | G02B 21/34 359/391 |
| 2010/0291619 A1 * | 11/2010 | Robinson | G01N 35/0099 435/288.7 |
| 2015/0177504 A1 * | 6/2015 | Bickert | G02B 21/34 348/80 |
| 2016/0245833 A1 * | 8/2016 | Lefebvre | G01N 35/00732 |
| 2023/0221342 A1 * | 7/2023 | Gebing | G01N 35/0099 422/63 |

FOREIGN PATENT DOCUMENTS

| | | |
|---|---|---|
| DE | 102013205001 B3 | 5/2014 |
| EP | 3324190 A1 | 6/2018 |
| JP | S60-30707 Y2 * | 9/1985 |
| WO | 9704347 A1 | 2/1997 |

OTHER PUBLICATIONS

Hudson Robotics, "Microscope Slide Loading using the Platecrane Arm for Lab Automation", YouTube, Feb. 21, 2014, https://www.youtube.com/watch?v=yNTefxvkA8.
English Abstract for DE102009015596 A1, Oct. 21, 2010.
International Preliminary Report on Patentability for Application No. PCT/DE2020/100283, Sep. 28, 2021.

* cited by examiner

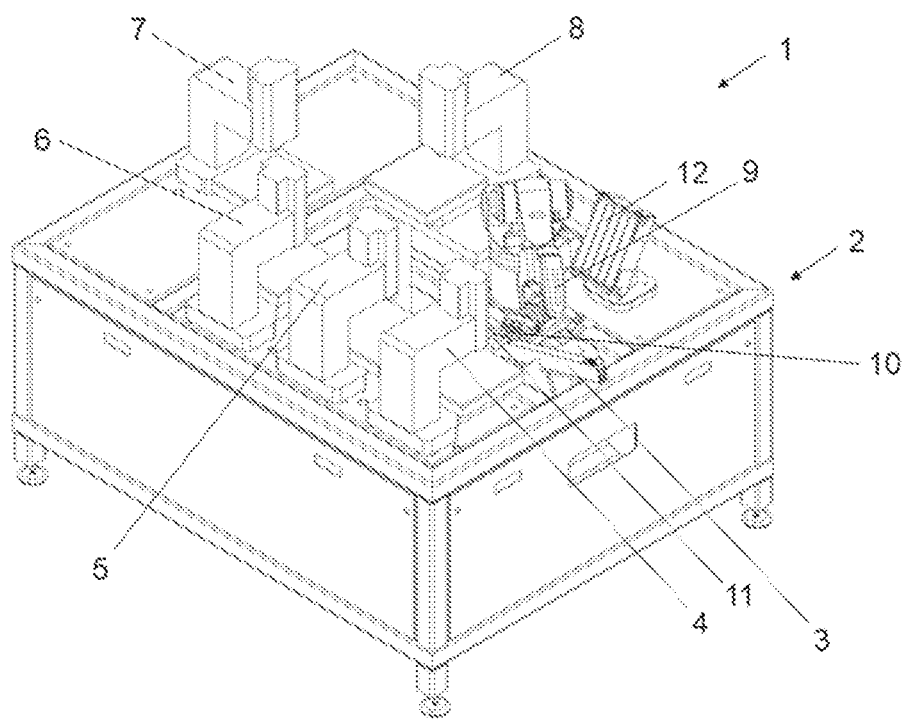

METHOD AND DEVICE FOR SCANNING MICROSCOPE SLIDES

This U.S. patent application is a national stage application of PCT/DE2020/100283 filed on 7 Apr. 2020 and claims priority of German patent document 10 2019 109 962.5 filed on 15 Apr. 2019, the entireties of which are incorporated herein by reference.

BACKGROUND AND SUMMARY OF INVENTION

The present invention relates to a method and a device for scanning microscope slides.

In many fields, in particular in the field of pathology, microscope slides with cell or tissue samples must be examined. For this, the microscope slide can be placed under a microscope and assessed by a pathologist. For some time, the conventional microscopes can be replaced by microscope slide scanners, which scan the microscope slides, store the detected data and make them available to the pathologist as a digital image on a screen.

Microscope slide scanners are known which have loading devices which can be loaded with a plurality of individual microscope slides which are to be scanned. Likewise, microscope slide scanners are known which have magazines specifically designed for the respective scanner, which can be loaded with microscope slides. The microscope slide scanner can thus scan the individual microscope slides in succession, without the microscope slides having to be inserted individually into the microscope slide scanner before each scanning process.

WO 97/04347A1 thus discloses an automatic microscope slide canner comprising a magazine which can be loaded with microscope slides which are to be scanned.

DE 60 2004 002 700 T2 discloses a slide feed unit for an automatic scanning microscope, which contains a magazine for receiving the microscope slides, from which the microscope slides can be removed by means of an elaborate device.

A disadvantage in the known microscope slide scanners is that the loading devices or magazines must be filled with microscope slides manually, by the microscope slides having to be removed individually from the microscope slide holders in which they are generally stored, and inserted into the loading device or the magazine. After the scanning process, the microscope slides must be removed manually again from the loading device or from the magazine.

A further disadvantage of the known automatic microscope slide scanners is that in the case of failure of a microscope slide scanner, which occasionally occurs, the microscope slides which have not yet been scanned at the time of failure are only scanned after the scanner returns into the start mode again or after the microscope slides which have not yet been scanned have been reloaded into another microscope slide scanner.

The scanning duration can vary considerably from microscope slide to microscope slide and is dependent on the size of the surface of the sample material which is to be examined. A disadvantage in the known devices and methods is, in addition, that a microscope slide scanner, which by chance is loaded with several samples which are to be scanned for a long time, requires considerably longer than a second microscope slide scanner which is loaded with samples which are only to be scanned for a short time. Thus it is additionally disadvantageous that it is very labour-intensive and time-consuming to reload samples from the microscope slide scanner which has not yet completed the scanning task, into the other microscope slide scanner, which has already worked through the scanning task completely, in order to utilize both microscope slide scanners to capacity and to achieve a shorter overall scanning duration.

The object of the invention is to provide a method for scanning microscope slides which overcomes the disadvantages known from the prior art. The object of the invention can thus be seen inter alia in providing a method for scanning microscope slides in which no laborious loading and unloading of the microscope slide canners is necessary, in which even in the case of failure of a microscope slide scanner, the samples which are not yet scanned are scanned automatically, and in which the overall scanning duration is shortened.

To solve the problem, a method is provided for scanning microscope slides using a device with at least one feed unit for microscope slide holders, with at least two microscope slide scanners, with at least one depositing device and with at least one industrial robot, comprising the steps:

a) loading the feed unit with at least one microscope slide holder, which holds at least one microscope slide,
b) removing a microscope slide from the at least one microscope slide holder
c) inserting the removed microscope slide into one of the microscope slide scanners
d) removing the microscope slide from one of the microscope slide scanners
e) depositing the microscope slide into the depositing device, wherein the steps b) to e) are carried out by the at least one industrial robot.

In this method, a feed unit is thus provided in which the microscope slide holders with the microscope slides which are to be scanned are stored centrally up to the scanning process, irrespective of which of the microscope slide scanners will carry out the scanning process. The individual microscope slide scanners are therefore not loaded manually in advance with a plurality of microscope slides which are scanned in succession. Rather, the microscope slide scanners are loaded automatically from the at least one central feed unit individually with the microscope slide which is respectively to be scanned. As soon as one of the microscope slide scanners has completed the scanning process, the microscope slide is removed and deposited into the depositing device. Thereafter, a new microscope slide is removed from the feed unit and placed into the microscope slide scanner which was last emptied. Consequently, all the microscope slide scanners are regularly utilized to capacity, and the microscope slides stored in the feed unit, which are still to be scanned, are scanned even if one of the microscope slide scanners were to fail.

In particularly urgent cases, the sequence of the microscope slides which are to be scanned can be altered by the exchanging of microscope slide holders or of individual microscope slides, without the method having to be interrupted. Thus, the scanning sequence can be established or altered without interruption to the method, according to the priority of the individual samples.

The feed unit is designed to receive microscope slide holders. Preferably, the feed unit is designed so that microscope slide holders of different manufacturers and with a different number of slots can be received indiscriminately one after another. In an advantageous configuration, the feed unit has at least one base plate and at least one front wall. Provision is likewise made according to the invention that the device comprises two or more feed units, so that different feed units can be used for different types of microscope slide holders.

Preferably, the feed unit is arranged so obliquely that a microscope slide holder which is placed onto the base plate slips, due to the weight force, towards the front wall of the feed unit or towards a microscope slide holder which is already present in the feed unit. The base plate of the feed unit thus forms a sloped plane. In this way, it is ensured that in the case of a feed unit which is loaded with microscope slide holders, a microscope slide holder always lies against the front wall.

In an advantageous embodiment, the feed unit has the shape of a U-profile, in which at least one end is closed by a front wall. The U-profile is preferably arranged so that the microscope slide holders can be inserted into the profile from above. Preferably, one end is arranged with a front wall lower than the other end, so that the base plate of the feed unit presents an oblique plane.

A microscope slide holder is a holder in which several microscope slides can be arranged substantially parallel to one another. The microscope slide holders preferably have slots for respectively 3 to 50 microscope slides. The microscope slides are preferably arranged in the slots in such a manner that one narrow side of the microscope slides points upwards and the other narrow side points downwards. The microscope slides can be drawn from the microscope slide holder at the upper narrow side.

Preferably, the step of removing the microscope slide from the microscope slide holder comprises a shaking step, in which the microscope slide which is gripped by the industrial robot is shaken before and/or during the removal from the microscope slide carrier. The carrying out of such a shaking movement causes microscope slides which are jammed in the microscope slide holder and/or which are stuck by adhesive residues from the covering process to be able to be removed in a harmless manner.

The microscope slide holder and the feed unit are preferably designed so that the feed unit can only be loaded with a microscope slide holder which is arranged in the intended orientation. This means that the microscope slide holder can only be loaded into the feed unit when the microscope slide is aligned so that an intended side of the microscope slide holder points to the front wall of the feed unit. This can be achieved in that one side of the microscope slide holder has an elevation or a nose which can be brought into engagement with a corresponding protuberance or recess in the loading region of the feed unit.

The two outwardly directed sides of the microscope slide holder which are arranged in the feed unit parallel to the two side faces of the U-profile of the feed unit thus differ from one another. Likewise, in such a configuration, the two side faces of the U-profile of the feed unit differ from one another. Generally, the individual microscope slides are inserted manually or automatically into a microscope slide holder after the staining of the samples and the covering process, so that all the microscope slides are aligned identically in the microscope slide holder. Through the established orientation of the microscope slide holders within the feed unit, it is guaranteed that all the microscope slides are aligned in the feed unit in an identical manner, so that a check does not have to be carried out as to how the microscope slide which is to be scanned is aligned. Which side of the microscope slide holder is the intended side can thus be established individually and depending on the carrying out of the staining- and covering process.

Preferably, the feed unit has a holding-down device, which is arranged so that the first microscope slide holder arranged on the front wall of the feed unit can not be removed upwards from the feed unit. Thus it can be prevented that a microscope slide holder which is not yet entirely emptied is lifted unintentionally during the removal of a microscope slide, whereby microscope slides which have not yet been scanned could fall out and become broken.

Preferably, the holding-down device is a nose or protuberance arranged on the feed unit. For the removal of the microscope slide holder, the latter is initially to be moved from the front wall and thus from the holding-down device in the direction of the other end of the feed unit, in order to be able to be subsequently removed upwards out of the feed unit.

The industrial robot preferably removes a microscope slide out of the first microscope slide holder lying against the front wall. As, under certain circumstances, not all the slots of the microscope slide holder are occupied by microscope slides, the industrial robot feels the individual, possibly empty, slots in succession, until it reaches an occupied slot, the microscope slide of which it is able to remove. In this way, it is ensured that the microscope slides arrive into one of the microscope slide scanners in the sequence in which they are situated in the microscope slide holder, and that each microscope slide is scanned.

In an advantageous embodiment of the invention, the method comprises in addition the steps:

f) removing the microscope slide from the feed unit and
g) depositing the microscope slide holder, preferably in a microscope slide holder depositing device, wherein the steps f) and g) are preferably carried out by the at least one industrial robot. Preferably, the steps f) and g) are carried out after step c), when all the microscope slides of a microscope slide holder are removed. The now empty microscope slide holder is thus removed from the feed unit and the microscope slides of a further microscope slide holder, arranged in the feed unit, can be removed for scanning. After the removal of the entirely emptied microscope slide holder, the downstream microscope slide holders automatically slip in the direction of the front wall. Through the automatic removal of the emptied microscope slide holders, space is created for the loading of the feed unit with further microscope slide holders.

"Microscope slide" is understood to mean, according to the invention, a microscope slide which contains the sample which is to be scanned. For this, the sample is usually arranged between the microscope slide glass plate and a cover glass or a transparent film. The microscope slide can comprise, in addition, a code which enables an identification of the sample or the ownership of the sample.

Provision is likewise made that the method according to the invention comprises a step in which the microscope slide code is scanned. Likewise, provision is preferably made that the information is stored concerning at which position and/or in which depositing device the scanned microscope slide is deposited. Preferably, for this, the microscope slides, in particular their codes, before the depositing in the depositing device, are detected by a separate scanner, so that the depositing location of each scanned microscope slide is able to be read at any time.

After the scanning of the microscope slides by the microscope slide scanners and before the depositing of the microscope slides, preferably a check is carried out as to whether the microscope slides have damage. It is thus ensured that no microscope slide part which is broken off during the loading or unloading process remains in one of the microscope slide scanners. Preferably, for this, the length of the microscope slides is checked. Preferably, the length check is carried out mechanically. Particularly preferably, the microscope slide is directed past a switch, in particular a microswitch, for the length check, so that said switch is only triggered when the microscope slide has the original length. For the case where it is established that the microscope slide has damage, provision is made that the microscope slide scanner in which the defective microscope slide was scanned is no longer loaded with a new microscope slide, but rather is deemed to be "blocked". The non-blocked microscope slide scanners, however, continue to be available, so that the method according to the invention can be carried out further.

In an advantageous embodiment of the invention, provision is made that the microscope slides which can not be scanned by the microscope slide scanners and/or in which the microscope slide code is not able to be read and/or in which damage has been ascertained, are not deposited in the depositing device, but rather are deposited in a separate collecting device for defective microscope slides These defective microscope slides thus do not have to be sought out subsequently from the depositing device for appraisal. This likewise applies for microscope slides inserted manually in a faulty manner into a microscope slide holder, which, when their microscope slide codes are not able to be read, are deposited in the separate collecting device.

The method according to the invention makes provision for the use of at least two microscope slide scanners. Thus, according to the invention at least 2, but also 3, 4, 5, 6, 7, 8, 9, 10 or more microscope slide scanners are used depending on the number microscope slides which are to be scanned. It is thus possible according to the invention to use single space microscope slide scanners, which are favourably priced and less liable to error, which have no loading devices or magazines for the storing of microscope slides.

The depositing device is a device in which the microscope slides, after the scanning process, are deposited arbitrarily or in an ordered manner. Preferably, the microscope slides are deposited in the sequence in which they are removed from the scanners and thus in the sequence in which they reach the depositing device, in the latter, irrespective of whether they were arranged in a different sequence in the feed unit. The depositing device can likewise consist of several partial depositing devices. Such a multi-part depositing device enables the exchange of a filled partial depositing device for a new partial depositing device whilst the method is running, as during the exchange process another partial depositing device is available for the depositing of the scanned microscope slides.

"At least one industrial robot" is understood to mean one or more programmable machines which can carry out at least the method steps b) to e) alone or together. If only one industrial robot is present, it must be able to carry out at least the method steps b) to e), for which it preferably comprises a robot arm, a control device and a gripper. Provision is likewise made according to the invention that more than one industrial robot is present, which can carry out at least the method steps b) to e). In a preferred embodiment of the invention, only one single industrial robot is used.

In an advantageous embodiment of the invention, the at least one industrial robot is a jointed-arm robot. Preferably, the at least one industrial robot is a 6-axis, a 7-axis- or an 8-axis jointed-arm robot. Preferably, the jointed-arm robot has a gripper for gripping the microscope slides. Preferably, a microscope slide is inserted into a microscope slide scanner by the jointed-arm robot which removes the microscope slide from a microscope slide holder.

The microscope slide scanners are arranged so that the industrial robot can load and unload each microscope slide scanner. The microscope slide scanners can be arranged in one plane. It is likewise possible, in particular with the use of a 7- or 8-axis jointed-arm robot, that the microscope slide scanners are arranged both adjacent to one another and also over one another, so that a wall of microscope slide scanners is formed. Several walls of microscope slide scanners can also be arranged around the industrial robot.

The method according to the invention comprises at least the steps:
 a) loading the feed unit with at least one microscope slide holder, which holds at least one microscope slide,
 b) removing a microscope slide from the at least one microscope slide holder
 c) inserting the removed microscope slide into one of the microscope slide scanners
 d) removing the microscope slide from one of the microscope slide scanners
 e) depositing the microscope slide into the depositing device.

The steps b) to e) are carried out by means of the at least one industrial robot.

In an advantageous embodiment, the steps a) to e) are carried out in the indicated sequence.

The method according to the invention can comprise further method steps. In an advantageous embodiment of the invention, the steps b) and c) are repeated so often before carrying out the steps d) and e) until each microscope slide scanner is loaded with a microscope slide.

The method steps b) to e) are preferably repeated so often until all the microscope slides are removed from the at least one microscope slide holder and/or until the depositing device is entirely filled.

In addition, provision is made according to the invention that simultaneously to one of the method steps b) to e), the method step a) is carried out once again. The method according to the invention thus makes provision for the further loading of the feed unit with microscope slide holders whilst the method is running.

In an advantageous embodiment of the invention, the method comprises the step
 transmitting an information signal with the information that the scanning process is completed, from a microscope slide scanner to the industrial robot,
wherein the removal of the microscope slide from the microscope slide scanner takes place only after the receiving of the information signal. The microscope slide scanners can thus transmit the information that the scanning process is completed, so that the microscope slide can be removed from the scanner. The information of the microscope slide scanners can be passed on to the at least one industrial robot via a control device. The control device can likewise be configured as a component part of the industrial robot itself.

In an advantageous embodiment of the invention, after the removal of the microscope slide from one of the microscope slide scanners and the depositing of the microscope slide in the depositing device, the industrial robot immediately subsequently removes a microscope slide from the at least microscope slide holder, and inserts this microscope slide into the microscope slide scanner which is not loaded or was last emptied, irrespective of whether in the meantime another microscope slide scanner has transmitted the information that the scanning process is completed. In this way, the downtime of the microscope slide scanners is shortened.

In an advantageous embodiment of the invention, the microscope slide scanners have respectively a rotatable mount for microscope slides. Particularly preferably, the mount is configured as a turntable, which turns through 90° about a vertical axis for loading. Several microscope slide scanners according to the prior art have a mount for microscope slides, in which the microscope slides are to be inserted laterally, from frontal view onto the microscope slide scanner. In order to facilitate the inserting of the microscope slides by the industrial robot, the microscope slide mount is turned, for loading, so that the microscope slides are to be inserted frontally into the mount.

The object of the invention is, in addition, to provide a device for scanning microscope slides which overcomes the disadvantages known from the prior art. The object of the invention can thus be regarded inter alia in providing a device by which the method according to the invention is able to be carried out.

To solve the problem, a device for scanning microscope slides is provided, comprising
- A) at least one feed unit, which is designed to receive microscope slide holders loaded with microscope slides,
- B) at least two microscope slide scanners,
- C) at least one depositing device to receive the scanned microscope slides and
- D) at least one industrial robot, which is designed
    - to remove a microscope slide from a microscope slide holder which is arranged in the feed unit,
    - to load each microscope slide scanner with a microscope slide,
    - to remove a microscope slide from each microscope slide scanner and
    - to deposit a microscope slide in a depositing device.

This device according to the invention is thus configured to carry out the method according to the invention. The device thus makes it possible that the method is carried out autonomously, continuously and without manual intervention. The at least one industrial robot of the device according to the invention can carry out the method steps according to the invention, in particular the steps b) to g). As already stated, an industrial robot, preferably in the form of a jointed-arm robot, can be concerned, or several industrial robots which in entirety can carry out all the method steps. Preferably, the device comprises only one single industrial robot, preferably a single jointed-arm robot, for the transport of the microscope slides from the feed unit to a microscope slide scanner and from a microscope slide scanner to the depositing device.

In an advantageous embodiment of the invention the at least one feed unit has a base plate and a front wall, wherein the base plate preferably presents an oblique plane with a low and a high end, wherein the front wall is preferably arranged at the low end of the base plate, wherein the low end of the base plate preferably has a holding-down device.

The device components A) to D) are preferably arranged on a base frame.

BRIEF DESCRIPTION OF THE DRAWING

The description of the device according to the invention and of the method according to the invention are to be provided as complementary to one another, so that information concerning the method, which is explained in connection with the device, is likewise to be understood individually or in a combined manner as information concerning the method. Features of the device which are explained in connection with the method according to the invention are to be understood individually or combined with one another also as features of the device according to the invention.

The invention is explained again below with the aid of the FIGURE.

FIG. 1 shows a schematic illustration of the device according to the invention.

DETAILED DESCRIPTION OF THE DRAWING

FIG. 1 shows a device 1 for scanning microscope slides, comprising a base frame 2, on which a feed unit 3, five microscope slide scanners 4, 5, 6, 7, 8, an industrial robot 9 and a depositing device 12 are arranged.

The feed unit 3 forms a type of chute for the microscope slide holders, so that the microscope slide holders, after the depositing on the base plate in the form of a sloped plane, slip to the front wall which is arranged lower.

The industrial robot 9 is a 6-axis jointed robot with a gripper 10, which holds the microscope slide 11. The microscope slide 11 was removed from the microscope slide mounting, arranged in the feed unit 3, by means of the gripper 10 and is inserted into the microscope slide scanner 4 which is not yet loaded, which subsequently carries out the scanning process. Subsequently, further microscope slides can be removed from the feed unit 3 and inserted into the not yet occupied microscope slide scanners 5, 6, 7, 8. This process can be repeated so often until all microscope slide scanners 4, 5, 6, 7, 8 are occupied. After the transmission of information that one of the microscope slide scanners 4, 5, 6, 7, 8 has completed the scanning process, the gripper 10 removes the microscope slide out of the corresponding microscope slide scanner and deposits it in the depositing device 12. The empty microscope slide scanner can now be loaded again with a microscope slide which is to be scanned.

LIST OF REFERENCE NUMBERS 1) device
2) base frame
3) feed unit
4) microscope slide scanner
5) microscope slide scanner
6) microscope slide scanner
7) microscope slide scanner
8) microscope slide scanner
9) industrial robot
10) gripper
11) microscope slide
12) depositing device

The invention claimed is:

1. A method for scanning microscope slides using a device with at least one feed unit for microscope slide holders, at least two microscope slide scanners, at least one depositing device and at least one industrial robot, comprising the steps:
    a) loading the at least one feed unit with at least one microscope slide holder, which holds at least one microscope slide,
    b) removing a microscope slide from the at least one microscope slide holder,
    c) inserting the removed microscope slide into one of the microscope slide scanners,
    d) removing the microscope slide from one of the microscope slide scanners, and
    e) depositing the microscope slide in the at least one depositing device,
    wherein the steps b) to e) are carried out by the at least one industrial robot, wherein the at least one feed unit has at least one base plate and at least one front wall and is arranged obliquely so that a microscope slide holder, placed onto the base plate, slips towards the front wall or towards a microscope slide holder which is already present in the at least one feed unit.

2. The method according to claim 1, wherein steps b) to e) are repeated until all the microscope slides are removed from the at least one microscope slide holder.

3. The method according to claim 1, wherein the at least one industrial robot is a jointed-arm robot.

4. The method according to claim 3, wherein the at least one jointed-arm robot has a gripper for gripping the microscope slides.

5. The method according to claim 1, further comprising transmitting an information signal with information that the scanning process is completed, from a first microscope slide scanner to the industrial robot,
wherein the removal of the microscope slide from the first microscope slide scanner takes place only after the receiving of the information signal.

6. The method according to claim 1, further comprising the steps:
f) removing the microscope slide holder from the at least one feed unit; and
g) depositing the microscope slide holder in a microscope slide holder depositing device,
wherein the steps f) and g) are carried out by the at least one industrial robot.

7. The method according to claim 1, wherein the microscope slide scanners respectively have a rotatable mount for microscope slides.

8. The method according to claim 1, wherein the at least one industrial robot, after the removal of the microscope slide from one of the microscope slide scanners and the depositing of the microscope slide in the at least one depositing device immediately following removes a microscope slide from the at least one microscope slide holder and inserts it into a microscope slide scanner which is not loaded.

9. The method according to claim 1, wherein steps b) and c) are repeated until each microscope slide scanner is loaded with a microscope slide.

10. The method according to claim 1, wherein the at least one industrial robot is a 6-axis jointed-arm robot.

11. The method according to claim 1, further comprising shaking a microscope slide gripped by the at least one industrial robot before and/or during said removing in step b).

12. A device for scanning microscope slides comprising:
A) at least one feed unit configured to receive microscope slide holders which are loaded with microscope slides, said at least one feed unit comprising a base plate and a front wall,
B) at least two microscope slide scanners,
C) at least one depositing device for receiving scanned microscope slides, and
D) at least one industrial robot, which is configured to:
remove a microscope slide from a microscope slide holder arranged in the at least one feed unit,
load each microscope slide scanner with a microscope slide,
remove a microscope slide from each microscope slide scanner, and
deposit a microscope slide in the at least one depositing device,
wherein the base plate is an oblique plane with a low end and a high end and the front wall is arranged at the low end.

13. The device according to claim 12, wherein the low end of the base plate has a holding-down device configured so that a microscope slide holder on the front wall cannot be removed upwards from the at least one feed unit.

14. The device according to claim 13, wherein the holding-down device is a nose or protuberance arranged on the at least one feed unit.

15. The device according to claim 12, further comprising a single base frame on which the at least one feed unit, the at least two microscope slide scanners, the at least one depositing device, and the at least one industrial robot are arranged.

16. The device according to claim 12, wherein the at least one feed unit has a U-shape between the base plate and the front wall.

17. A device for scanning microscope slides, comprising:
two or more feed units, wherein different feed units are configured to receive different types microscope slide holders loaded with microscope slides;
two to ten microscope slide scanners arranged in one plane;
at least one depositing device for receiving scanned microscope slides; and
at least one 7- or 8-axis robot industrial robot, which is configured to:
remove a microscope slide from a microscope slide holder;
load each microscope slide scanner with a microscope slide;
remove a microscope slide from each microscope slide scanner; and
deposit a microscope slide in the at least one depositing device.

* * * * *